(12) United States Patent
Rylander et al.

(10) Patent No.: US 6,748,384 B1
(45) Date of Patent: Jun. 8, 2004

(54) SYSTEM AND METHOD FOR DYNAMICALLY SUMMARIZING DATA STORES

(75) Inventors: Steve C. Rylander, Elk Grove, CA (US); Justin M. R. Strong, El Dorado Hills, CA (US)

(73) Assignee: Objective Systems Integrators Inc., Folsom, CA (US)

( * ) Notice: Subject to any disclaimer, the term of this patent is extended or adjusted under 35 U.S.C. 154(b) by 393 days.

(21) Appl. No.: 09/737,291

(22) Filed: Dec. 13, 2000

(51) Int. Cl.$^7$ ............................................. G06F 17/30
(52) U.S. Cl. ......................................... 707/10; 709/224
(58) Field of Search ........................ 707/3, 4, 10, 101, 707/104.1; 709/203, 224, 227; 379/88.22; 705/10; 711/129; 717/147; 713/400; 714/4; 370/231, 232, 238, 412, 414

(56) References Cited

U.S. PATENT DOCUMENTS

| | | | | |
|---|---|---|---|---|
| 5,680,573 A | * | 10/1997 | Rubin et al. | 711/129 |
| 6,061,763 A | * | 5/2000 | Rubin et al. | 711/129 |
| 6,385,604 B1 | * | 5/2002 | Bakalash et al. | 707/3 |
| 6,449,618 B1 | * | 9/2002 | Blott et al. | 707/101 |
| 6,529,909 B1 | * | 3/2003 | Bowman-Amuah | 707/10 |

OTHER PUBLICATIONS

U.S. patent application Ser. No. 09/735,758, Rylander et al.

* cited by examiner

Primary Examiner—Diane D. Mizrahi

(57) ABSTRACT

A system and method are disclosed which utilize a computer executable software program to generate software code for constructing desired summary data for one or more data stores. A preferred embodiment provides a software program that is capable of dynamically creating application software code for summarizing one or more data stores in the manner desired by an end user. Most preferably, the software program enables a user to define a desired summary through a graphical user interface, and the software program then generates the necessary software code for achieving the desired summary. Upon executing the generated software code, a desired summary is obtained, which may be stored within a "summary data store" and/or included within a summary report, as examples. Specifically, the generated software code may be executed to "construct" the desired summary data. In a preferred embodiment, a user may request a summary that includes data retrieved directly from one or more data stores, and/or data that can be constructed through manipulation of the data stored within such one or more data stores (e.g., through mathematical operations with such stored data). Therefore, as used herein "constructing" is not limited merely to directly retrieving the data from the one or more data stores, but is intended to also encompass manipulating data retrieved from such one or more data stores in order to "construct" the desired summary data. Accordingly, a preferred embodiment does not require the user to manually write code for constructing a desired summary of a data store.

37 Claims, 2 Drawing Sheets

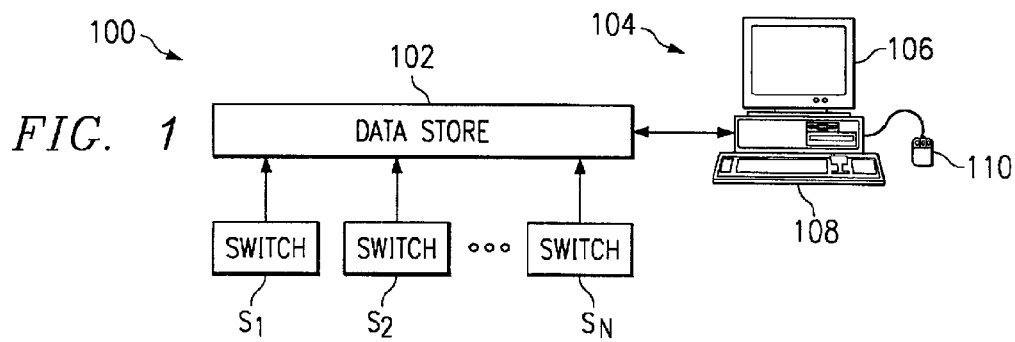

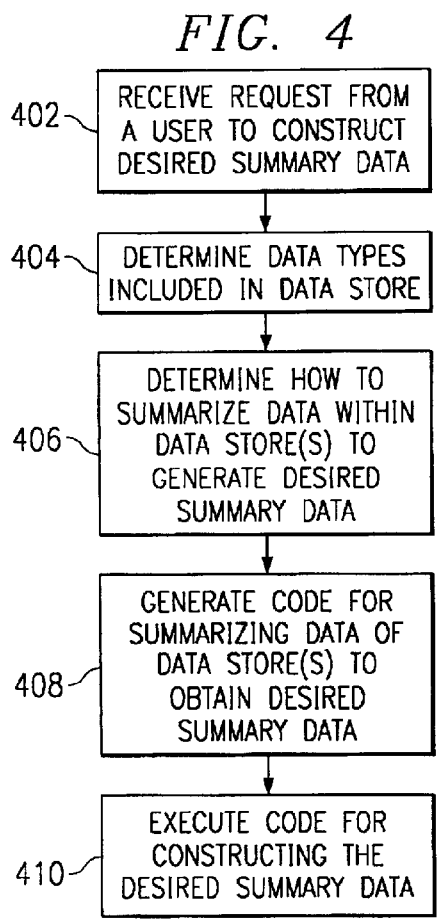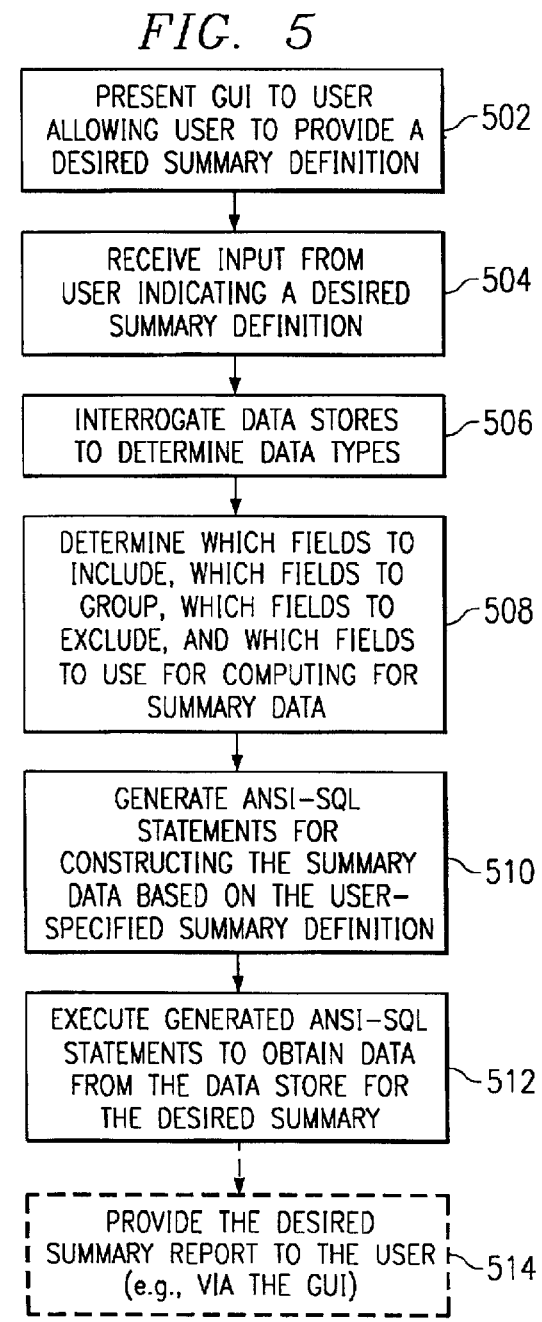

SYSTEM AND METHOD FOR DYNAMICALLY SUMMARIZING DATA STORES

RELATED APPLICATIONS

This application is related to concurrently filed Dec. 13, 2000 and commonly assigned U.S. patent application Ser. No. 09/735,758 entitled "NEAR REAL-TIME PRESENTATION OF CUSTOMIZED DATA ACROSS MULTIPLE DATA SOURCE TYPES," the disclosure of which is hereby incorporated herein by reference.

TECHNICAL FIELD

The present invention relates in general to a system and method for generating a summary of data within a data store, such as a database, and in specific to a system and method which provide a computer program that generates computer executable software code for creating a summary of a data store as specified by a user.

BACKGROUND

The information technology age has lead to an increasingly large amount of data being collected and stored in various formats. Users, including companies, depend heavily on electronically stored data, and often require efficient methods for retrieving the stored data. For instance, large databases are often maintained on computer systems, which may comprise a large number of data records. Generally, users may query the database to retrieve desired information therefrom. Of course, many different methods for storing (and organizing) data are available. A collection of data is referred to generally herein as a "data store," and is intended broadly to refer to any type of data storage method, including without limitation databases (such as relational databases), text-based flat files, and tables.

Generally, as the number of different data stores maintained increases, it becomes increasingly difficult for a user to obtain a desired summary of the data contained within a data store. As one example, consider a network management system which stores data for various network elements (e.g., devices communicatively coupled to the network). For instance, a network management system may manage various networks, including wireline, wireless, and Internet Protocol (IP) networks, and may maintain data stores for the various elements of each network type. Of course, many different data stores may be maintained, each having a different format. For example, a first telephone switch may be included within the managed network, and a data store may be maintained for the first telephone switch, which includes various fields of various types (e.g., numeric data, character-based data, timestamp data, etcetera). For instance, such a data store may include a time field having timestamp format, a month field having character (text) format, a year field having numeric format, and a usage field having numeric format. Another network element (e.g., another telephone switch or other network device) may be included within the managed network, and a data store may be maintained for such network element in a similar manner. Of course, the data store for this network element may include different fields, which may include different types of data than included in the data store for the first telephone switch.

Often, a user desires to obtain a summary of a data store. For example, in the above-described network management system, a user may desire to obtain a summary of the usage of the first telephone switch during the month of April. Most modern-day database technologies provide support for some form of database summarization against user-defined data stores. However, as each data store is defined, computer executable software code must be written to define how to summarize the data store. That is, an end user is typically required to manually write software code to query the data store and summarize its data in the manner desired by the user. Thus, in the prior art, an end user is typically required to manually write software code for summarizing data within a data store for each type of summary desired by the end user. Additionally, because each data store may have a different format, an end user is further required to manually write separate software code for summarizing each of the various types of data stores in the manner desired by the end user. As a result, significant amount of development overhead is typically required to support data stores in a manner that enables an end user to obtain a desired summary of such data stores.

SUMMARY OF THE INVENTION

The present invention is directed to a system and method which utilize a computer executable software program to generate software code for constructing desired summary data for one or more data stores. A preferred embodiment of the present invention provides a computer executable software program that is capable of dynamically creating application software code for summarizing one or more data stores in the manner desired by an end user. More specifically, a preferred embodiment provides a software program which enables a user to define a desired (or customized) summary, and the software program then generates the necessary software code for achieving the desired summary.

The generated software may be executed to "construct" the desired summary of one or more data stores. More specifically, the generated software code may be executed to "construct" a data summary from one or more data stores. In a preferred embodiment, the resulting summary data may be obtained either directly from one or more data stores, or indirectly from such one or more data stores, e.g., the data retrieved from such one or more data stores may be manipulated in some manner by the generated software code to "construct" the desired summary data. For instance, in a most preferred embodiment, the computer program for generating software code for constructing desired summary data may be implemented within a management system (e.g., a network management system), and data stores may include performance data for one or more network elements being managed by such management system. In a preferred embodiment, a user may request a summary that includes data retrieved directly from one or more data stores, and/or data that can be constructed through manipulation of the data stored within such one or more data stores (e.g., through mathematical operations with such stored data). Therefore, when the present disclosure describes that the generated software code constructs the desired summary data from one or more data stores, it should be recognized that such "constructing" is not limited merely to directly retrieving the data from the one or more data stores, but is intended to also encompass manipulating data retrieved from such one or more data stores (e.g., through performing mathematical operations with such data) in order to "construct" the desired summary data.

Upon executing the generated software code, a desired summary is obtained, which may be stored within a "summary data store" and/or included within a summary report.

For instance, upon executing the generated software code, such software code may create a new "summary data store" in which the desired summary report is stored, and a user may generate a report that may be displayed to a display or printed to a printer, as examples, (or otherwise retrieve information) from the summary data store. Thus, in a most preferred embodiment, the generated software code may dynamically create user-defined "summary data stores" that summarize one or more of other data stores.

Accordingly, the user is not required to manually write the code for the desired summary. That is, in a preferred embodiment, a user interacts with a software program (e.g., through a graphical user interface) to provide a summary definition (e.g., specifying a summary of one or more data stores desired by the user), and the software code for achieving the summary is generated by the software program, rather than the user being required to manually write such software code. As a result, desired information can be obtained from one or more data store more easily and more efficiently than with prior art techniques.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIG. 1 shows an exemplary environment in which a most preferred embodiment may be implemented;

FIG. 2 shows an exemplary data structure that may be implemented for a first network element;

FIG. 3 shows an exemplary data structure that may be implemented for a second network element;

FIG. 4 shows an exemplary flow diagram for the operational flow of a computer executable program of a preferred embodiment; and FIG. 5 shows a further exemplary operational flow diagram in greater detail for the operational flow of a computer executable program of a most preferred embodiment.

DETAILED DESCRIPTION

A preferred embodiment of the present invention provides a computer executable software program that is capable of dynamically creating application software code for summarizing one or more data stores in the manner desired by an end user. More specifically, a preferred embodiment provides a software program which enables a user to define a desired (or customized) summary, and the software program then generates the necessary software code for achieving the desired summary. Upon executing the generated software code, a desired summary is obtained, which may be stored within a "summary data store" and/or included within a summary report. For instance, upon executing the generated software code, such software may create a new "summary data store" in which the desired summary report is stored, and a user may generate a report that may be displayed to a display or printed to a printer, as examples, (or otherwise retrieve information) from the summary data store. Thus, in a most preferred embodiment, the generated software code may dynamically create user-defined "summary data stores" that summarize one or more of other data stores. Accordingly, the user is not required to manually write the code for the desired summary. That is, in a preferred embodiment, a user interacts with a software program (e.g., through a graphical user interface) to provide a summary definition (e.g., specifying a summary of one or more data stores desired by the user), and the software code for achieving the summary is generated by the program, rather than the user being required to manually write such software code. As a result, desired information can be obtained from one or more data store more easily and more efficiently than with prior art techniques.

In a preferred embodiment, meta-data, which is data about data, is maintained for data stores. Such meta-data may then be utilized by a software program (e.g., may be queried) to dynamically generate the software code for summarizing a data store in a manner desired by a user. In a most preferred embodiment, the meta-data for a data store describes the number of fields (or columns) included within such data store, as well as the format of the data contained in each field (e.g., whether timestamp data, character-based data, numeric data, etcetera). Furthermore, in a most preferred embodiment, a user is capable of indicating the type of summary desired (e.g., is capable of providing a summary definition specifying the type of summary desired), and the software program utilizes the meta-data to generate the appropriate code for summarizing the data store in the manner desired.

Turning to FIG. 1, an exemplary environment 100 in which a most preferred embodiment may be implemented is shown. As shown, a data store 102 is implemented, which may be a database, for example. Such data store 102 may be implemented within or communicatively coupled to a management system (e.g., a network management system), for example. In the example of FIG. 1, various network elements, such as telephone switches $S_1$, $S_2$, . . . $S_N$, are provided, and data for such switches (or other network elements) may be stored in data store 102. For instance, performance data for such network elements may be stored in data store 102. Of course, multiple data stores 102 may be included, which may each include data for one or more different network elements.

Further shown is a processor-based computer system 104, which may be any type of processor-based system including without limitation a personal computer (PC), laptop computer, or personal data assistant (PDA). Computer 104 may include a display 106 and one or more input devices, such as keyboard 108 and mouse 110, and computer 104 is communicatively coupled to data store 102, thereby allowing information from such data store to be accessed by computer 104. For instance, computer 104 may comprise a management system or be communicatively coupled to a management system that includes data store 102. In a preferred embodiment, computer 104 executes a software program allowing a user to indicate (e.g., using input devices such as keyboard 108 and/or mouse 110) a desired summary of one or more data stores 102, and such software program then generates the code necessary for obtaining the desired summary of such one or more data stores 102. Such generated code may then be executed on computer 104 to access data store 102 and produce the desired summary of one or more data stores 102, which may then be stored within a "summary data store" and/or written to a summary report, which may be displayed to the user on display 106, for example. In a most preferred embodiment, the generated code is executed to produce the desired summary, which is stored as a newly created "summary data store," and a user may then have the summary information displayed, printed, or otherwise reported from the summary data store. As an example, a user may query the resulting summary data store to request all or certain parts of the summarized data from the summary data store.

It should be recognized that data may be stored within one or more data stores 102 in different formats for each of switches $S_1$–$S_N$. That is, the data structure of each switch (or other network element) may be different. An exemplary data structure that may be utilized for switch $S_1$ is shown in FIG. 2, and an exemplary data structure for switch $S_2$ is shown in FIG. 3. As shown in FIG. 2, data structure 200 for switch $S_1$ may include an identifying field 202, year field 204, month field 206, day field 208, hour field 210, minute field 212, and various performance measurement fields 214. Each field includes a particular type of data. For example, the identifying field 202 is a character-based field that allows up to 50 characters for identifying switch $S_1$ (and is therefore shown as having type C50). On the other hand, the remaining fields are numeric fields of various lengths. For example, year field 204 is a numeric field that allows four digits for specifying the year. Exemplary data structure 200 includes ten performance measurement fields 214. For instance, one performance measurement field may provide a total amount of usage of switch $S_1$, another performance measurement field may provide an average usage of switch $S_1$, etcetera. Thus, a record may be stored within data store 102 (of FIG. 1) for switch $S_1$, which identifies a date/time that the record was generated (in fields 204, 206, 208, 210, and 212) and includes various performance measurements for switch $S_1$.

As shown in FIG. 3, data structure 300 for switch $S_2$ may include an identifying field 302, report date field 304, time field 306, and various performance measurement fields 308. Again, each field includes a particular type of data. For example, the identifying field 302 is a character-based field that allows up to 50 characters for identifying switch $S_2$ (and is therefore shown as having type C50). Report date field 304 is a date stamp field, which includes a date stamp of the date in which the record was created. Report time field 306 is a time stamp field, which includes a time stamp of the time that a record was created. Performance measurement fields 308 are numeric fields having a length of 18 digits. Exemplary data structure 300 includes 50 performance measurement fields 308. For instance, one performance measurement field may provide a total amount of usage of switch $S_2$, another performance measurement field may provide an average usage of switch $S_2$, etcetera. Thus, a record may be stored within data store 102 (of FIG. 1) for switch $S_2$, which identifies a date that the record was generated (in field 304), the time the record was generated (in field 306), and includes various performance measurements for switch $S_2$ (in fields 308).

Turning to FIG. 4, an exemplary flow diagram is shown for the operational flow of a computer executable program of a preferred embodiment. As shown, in block 402 the program receives a request from a user to construct desired summary data for one or more data stores, which may be constructed into a summary data store or summary report as examples. Thus, in a preferred embodiment, a user can specify (or define) the type of summary desired. For example, in a preferred embodiment, a user may specify a summary that details the average usage of a particular network element (e.g., a switch) over the past month. As another example, the user may specify another summary that details the total usage of a particular network element over the past week. As still a further example, the user may specify another summary that details the maximum amount of usage of a network element over the past year. While a preferred embodiment allows a user to specify the type of summary to be created for one or more data stores, the user is not required to manually write the software code necessary for querying the data stores and creating the specified summary data store or summary report.

At block 404, the program determines the data types included in the data store(s) to be queried. For example, if a user desires to query data store 102 (FIG. 1) for information about switch $S_1$, the program may determine the fields and types of each field for the records containing information for switch $S_1$. For instance, the program may determine that the information stored for switch $S_1$ includes the fields having the types shown in FIG. 2. In a most preferred embodiment, meta-data is maintained for the data stored in the data store(s), and such meta-data may be queried by the program to determine information about the data stored within the data store(s). For example, meta-data may be maintained and queried for each data store or for each data structure contained within the data store. For instance, meta-data may be maintained describing the data stored for a first network element (e.g., switch $S_1$), and meta-data may also be maintained describing data stored for another network element (e.g., switch $S_2$). Such meta-data for each network element (or each data store to be included in the user-defined summary) may, in a preferred embodiment, be queried by the program to determine information about the types of data stored for each network element (or each data store to be included in the user-defined summary). Accordingly, the program may determine the fields and types of data stored within the data store(s), from which the program is to generate the desired summary data, which may be stored to a summary data store or output as a summary report, as examples.

At block 406, the program determines how to summarize the data stored within the data store(s) to generate the desired summary data. For example, suppose that a user desires a summary about switch $S_1$, which has a data structure 200 as shown in FIG. 2. More specifically, suppose that the user specifies that he/she desires a summary providing a monthly average usage of the switch $S_1$ for each quarter of the past year. The program may determine that usage data available for multiple months would need to be used in computing the desired monthly average usage. For example, suppose that one of the performance measurement fields 214 is the total usage of switch $S_1$. In that case, the program may determine that given the data available in data structure 200, the program will need to sum the total usage fields for the first three months of the past year, and then divide that sum total by three to determine the average for a month of the first quarter of the past year. The program may determine that it will compute the monthly average for the second, third, and fourth quarters in a similar manner. Thus, certain data of data structure 200 may be grouped (e.g., data for the first three months of the past year), certain data may be excluded (e.g., day, hour, and minute data), and certain data may be used in further computing the desired summary data to be included in the specified summary. Because various different fields having various different types may be included in different data structures (e.g., for different network elements), the program determines, at block 406, how to utilize the data that is available in a particular data store to create the specified summary.

At block 408, the program generates the computer executable software code for constructing the user-specified summary data. That is, the program generates the computer executable software code for summarizing the data store(s) (e.g., through querying such data store(s)) to obtain the desired summary data. Accordingly, in a preferred embodiment, the user is not required to manually write the computer source code, but instead such code is generated by a software program based on the user-specified summary desired. At block 410, the software program (or the user) executes the generated software code to summarize one or more data stores (e.g., through querying such data stores to construct the necessary summary data). For instance, upon generating the proper software code, the software program may execute such code to construct the desired summary data from one or more data stores. Alternatively, the generated software code may be stored (e.g., as an executable application program), and the user may then execute such generated software code to construct the desired summary data.

It should be understood that the operational flow diagram of FIG. 4 is intended only as an example, and one of ordinary skill in the art will recognize that in alternative embodiments the order of operation for the various blocks may be varied, certain blocks of operation may be omitted completely, and additional operational blocks may be added. Thus, the present invention is not intended to be limited only to the operational flow diagram of FIG. 4 for generating code operable to obtain user-specified summary data for one or more data stores, but rather such operational flow diagram is intended solely as an example that renders the disclosure enabling for many other operational flow diagrams for implementing a program for generating such code.

Turning now to FIG. 5, a further exemplary operational flow diagram is shown in greater detail for the operational flow of a computer executable program of a most preferred embodiment. As shown, in block 502 the program presents a graphical user interface (GUI) to a user that is capable of interacting with a user to allow a user to specify (or define) a desired summary (e.g., to provide a desired summary definition). More specifically, the GUI may allow the user to specify one or more data stores (or network elements) for which desired summary data is to be constructed, as well as the various details to be included in the summary data, wherein such summary data may be stored as a summary data store or reported as a summary report, as examples. At block 504, the program receives input from the user (e.g., via the GUI) indicating a desired summary definition, which defines the summary data desired to be constructed from one or more data stores.

At block 506, the program interrogates such one or more data stores to determine the data types included within such data stores. For example, if a user desires to query data store 102 (FIG. 1) for information about switch $S_1$, the program may determine the fields and types of each field for the records containing information for switch $S_1$. For instance, the program may determine that the information stored for switch $S_1$ includes the fields having the types shown in FIG. 2. As described above, in a most preferred embodiment, meta-data for the data stores to be summarized may be queried to determine the types of data included within each of such data stores.

At block 508, the program determines how to utilize the data stored within the data store(s) to generate the desired summary. That is, the program determines which fields of a data store to include, which fields to group, which fields to exclude, and which fields to use for computing information to be included in a desired summary. For instance, as described in the above example wherein a user desires a summary about switch $S_1$, which is stored as data structure 200 of FIG. 2), that provides a monthly average usage of switch $S_1$ for each quarter of the past year, certain data of data structure 200 may be grouped (e.g., data for the first three months of the past year), certain data may be excluded (e.g., day, hour, and minute data), and certain data may be used in further computing the desired summary data.

As a further example, suppose that a user desires a summary that details total usage per hour of switch $S_1$ for Apr. 1, 1999, and total usage per hour of switch $S_2$ for Apr. 1, 1999. Thus, for instance, the program may determine that data structure 200 (of FIG. 2) will be accessed for switch $S_1$ and data structure 300 (of FIG. 3) will be accessed for switch $S_2$ in order to create the desired summary. Further suppose that one of the performance measurement fields 214 of data structure 200 provides total usage, and one of the performance measurement fields 308 of data structure 300 provides total usage. Thus, the program may determine that given the data available in data structure 200, the program will need to utilize the data from the total usage field for each hour of Apr. 1, 1999 to create the desired summary. That is, assuming that one or more records are generated for switch $S_1$ each hour, the program may utilize the total usage field for each hour (determined by the hour field 210) for Apr. 1, 1999 (determined by the month, day and year fields). If multiple records of total usage are generated for each hour (e.g., a total usage provided for each half hour), the program will need to sum such total usage fields to result in the total usage for each hour. The program may determine the records for Apr. 1, 1999 using the month field 206, the day field 208, and the year field 204. The program may determine the records for each hour of that day using the hour field 210, and may then sum the data of the total usage field for each hour (assuming there exists multiple records for each hour) to create an hour by hour total of usage for switch $S_1$. Accordingly, in a preferred embodiment, the program can determine which records and which fields of such records to query for summarizing the data store(s) in the manner desired by the user, and the program can thus generate the proper software code for constructing the desired summary data.

However, different fields are available in data structure 300 for switch $S_2$, and therefore the program may take a different approach to determine the hour by hour usage for switch $S_2$. For example, given the data available in data structure 300, the program may determine the records for Apr. 1, 1999 using the report date field 304, which is date stamp data. The program may determine the records for each hour of that day using the report time field 306. That is, the program may evaluate the time stamp data of field 306 to determine the records for each hour of that day. The program may then sum the data of the total usage field for each hour (assuming there exists multiple records for each hour) to create an hour by hour total of usage for switch $S_2$.

As the above example illustrates, the program determines, at block 508, the appropriate fields to use in creating the user-specified summary. More specifically, the program determines the appropriate fields to utilize in the generated software code for constructing the summary data as desired by the user. As the above example further illustrates, in a preferred embodiment, a user may specify a summary that includes data from one or more various data stores (or data structures). For example, in a network management system, summary data may be constructed which includes data for various different network elements. Thus, in a preferred embodiment, a user may define a desired summary that includes data from multiple different data stores. For instance, in the above example, summary data may be constructed that includes total hourly usage for switch $S_1$ and also includes total hourly usage for switch $S_2$. On the other hand, the user may request a summary (e.g., through the summary definition provided by the user) which provides a combined total hourly usage of both switches $S_1$ and $S_2$, in which case the resulting summary data will include a single, combined total hourly usage for switches $S_1$ and $S_2$ in this latter case, the generated software code may execute to construct information from two different data stores (e.g., one for each of switches $S_1$ and $S_2$), and then sum the total usage of each switch for each hour to result in a combined hourly usage total for the two switches as the summary data. Accordingly, it should be recognized that the resulting summary data may not be obtained directly from a data store, but instead, the generated software code may perform particular operations on the data constructed from one or more data stores to result in the desired summary data. Therefore, when the present disclosure describes that the generated software code constructs the desired summary data from one or more data stores, it should be recognized that such "constructing" is not limited merely to directly retrieving the data from the one or more data stores, but is intended to also encompass manipulating data retrieved from such one or more data stores (e.g., through performing mathematical operations with such data) in order to "construct" the desired summary data.

At block 510, the program of a most preferred embodiment generates ANSI (American National Standards Institute) SQL (Structured Query Language) statements (or code) for summarizing the data store(s) (e.g., through querying the data store(s)) based on the user-specified summary definition. That is, the program generates the appropriate ANSI SQL statements for querying the data store(s) to construct the desired summary data. Of course, it should be recognized that the generated software code according to the present invention is not intended to be limited only to ANSI SQL code, but is instead intended to encompass any coding language now known or later developed for querying and/or manipulating data included within one or more data stores to construct summary data of such data stores. Thus, while ANSI SQL code is used as an exemplary coding language herein, it is intended solely as an example, which renders the disclosure enabling for any other suitable coding language.

Accordingly, in a preferred embodiment, the user is not required to manually write the computer source code, but instead such code is generated by a software program based on the user-specified summary definition. At block 512, the software program (or the user) executes the generated ANSI SQL statements to construct data from the data store(s) for the desired summary. As described above, the constructed summary data may be stored to a summary data store. At block 514, the constructed summary may be provided to the user (e.g., as a report). Such summary data may be provided in any number of ways, such as via display 106 (of FIG. 1), which may utilize the GUI with which the user interacted to request/define the summary, a printer, or any other suitable method. The created summary data and/or a summary report may be saved to memory, which is intended to encompass any type of data storage device now known or later developed, including but not limited to a computer's hard drive, floppy drive, CD-ROM drive, or other data storage device.

It should be understood that the operational flow diagram of FIG. 5 is intended only as an example, and one of ordinary skill in the art will recognize that in alternative embodiments the order of operation for the various blocks may be varied, certain blocks of operation may be omitted completely, and additional operational blocks may be added. Thus, the present invention is not intended to be limited only to the operational flow diagram of FIG. 5 for generating code operable to construct user-specified summary data for one or more data stores, but rather such operational flow diagram is intended solely as an example that renders the disclosure enabling for many other operational flow diagrams for implementing a program for generating such code.

In view of the above, it should be recognized that a preferred embodiment provides a software program operable to dynamically generate the appropriate software code for constructing user-specified (or user defined) summary data that summarizes one or more data stores. Accordingly, a user is not required to manually write software code for creating such a summary of the data stores. Additionally, in a preferred embodiment, once the appropriate software code is generated for constructing desired summary data, the code may be executed by a user periodically, or the user may specify that the software program execute the code at certain times (or upon the occurrence of certain events). For example, the user may specify a daily summary that is to be run at a certain time each day, and the software program may then execute the generated code for creating the summary each day, as desired. Thus, a preferred embodiment allows a user to easily create customized summaries utilizing data included in one or more data stores without being required to write the software code necessary for querying the data store(s) and computing/organizing data from the data store (s) to create the desired summary.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for constructing summary data that summarizes data of at least one data store, said method comprising:
   receiving a request from a user for desired summary data of at least one data store having a data structure;

generating software code executable to construct the desired summary data using meta-data for the at least one data store to determine the data structure of the at least one data store;

retrieving data from the at least one data store; and performing mathematical operations on the retrieved data using the software code.

2. The method of claim 1 wherein a user requesting the desired summary data is not required to write software code executable to construct the desired summary data.

3. The method of claim 1 wherein said software code executable to construct the desired summary data includes:

software code executable to retrieve data from the at least one data store.

4. The method of claim 3 wherein said software code executable to construct the desired summary data further includes:

software code executable to manipulate data retrieved from the at least one data store.

5. The method of claim 1 further comprising:

executing the generated software code to construct the desired summary data of the at least one data store.

6. The method of claim 1 further comprising:

said computer program presenting a graphical user interface to a user to enable the user to request the desired summary data.

7. The method of claim 1 further comprising:

said computer program determining the data structure of the at least one data store.

8. The method of claim 7 wherein said determining includes:

said computer program interrogating the at least one data store to determine its data structure.

9. The method of claim 7 wherein said determining includes:

ascertaining which fields of the at least one data store to include for the desired summary data and which fields of the at least one data store to exclude from the desired summary data.

10. The method of claim 9 wherein said ascertaining includes ascertaining which fields of the at least one data store to include for the desired summary data based on the request for the desired summary data.

11. The method of claim 9 wherein said determining further includes:

ascertaining which fields of the at least one data store to group together.

12. The method of claim 9 wherein said determining further includes:

ascertaining which fields of the at least one data store to use for computing information for the desired summary data.

13. The method of claim 1 wherein said generating software code is based at least in part on said request for the desired summary data.

14. The method of claim 13 wherein said request is received as input from a user desiring the summary data.

15. The method of claim 1 wherein said generating software code includes:

generating ANSI SQL statements for querying the at least one data store.

16. The method of claim 1 further comprising:

storing the summary data to a summary data store.

17. The method of claim 16 wherein the generated software code is executable to perform said storing.

18. The method of claim 16 further comprising:

creating said summary data store.

19. The method of claim 18 wherein the generated software code is executable to perform said creating.

20. Computer executable program code provided on a medium readable by a processor-based device for generating software code executable to provide a user-defined summary of at least one data store, said computer executable program code comprising:

code for presenting a user interface to a user to allow the user to specify desired summary data to be constructed about at least one data store having a data structure;

code for generating computer executable software code that is executable to construct the desired summary data using meta-data for the at least one data store to determine the data structure of the at least one data store;

code for retrieving data from the at least one data store; and code for performing mathematical operations on the retrieved data using the software code.

21. The computer executable program code of claim 20 wherein said user interface is a graphical user interface.

22. The computer executable program code of claim 20 wherein said user interface allows a user to specify summary data desired including defining the summary data desired by said user.

23. The computer executable program code of claim 20 wherein said computer executable program code is executing on a processor-based management system.

24. The computer executable program code of claim 23 wherein said management system is a network management system.

25. The computer executable program code of claim 23 wherein performance data for at least one network element managed by said management system is stored in said at least one data store.

26. The computer executable program code of claim 20 wherein said user desiring the summary data is not required to write software code executable to construct the desired summary data.

27. The computer executable program code of claim 20 wherein the generated computer executable software code that is executable to construct the desired summary data includes:

code executable to retrieve data from said at least one data store.

28. The computer executable program code of claim 27 wherein the generated computer executable software code that is executable to construct the desired summary data further includes:

code executable to manipulate data retrieved from said at least one data store.

29. The computer executable program code of claim 20 further including:

code executable to determine the data structure of the at least one data store.

30. The computer executable program code of claim 29 code executable to determine the data structure includes code for interrogating the at least one data store to determine its data structure.

31. The computer executable program code of claim 20 further including:

code executable to ascertain which fields of said at least one data store to include for the desired summary data and which fields of said at least one data store to exclude from the desired summary data.

32. The computer executable program code of claim 31 wherein said code executable to ascertain which fields of said at least one data store to include for the desired summary data ascertains said fields based on the specified summary data input to the user interface by the user.

33. The computer executable program code of claim 31 further including:
   code executable to ascertain which fields of said at least one data store to group together.

34. The computer executable program code of claim 31 further including:
   code executable to ascertain which fields of said at least one data store to use for computing information for the desired summary data.

35. The computer executable program code of claim 20 wherein the generated computer executable software code includes ANSI SQL statements for querying said at least one data store.

36. The computer executable program code of claim 20 wherein the generated computer executable software code includes code executable to store the summary data to a summary data store.

37. The computer executable program code of claim 36 wherein the generated computer executable software code includes code executable to create said summary data store.

* * * * *